H. W. GEPP.
TREATMENT OF ZINC BEARING ORES.
APPLICATION FILED NOV. 7, 1919.
1,395,811. Patented Nov. 1, 1921.
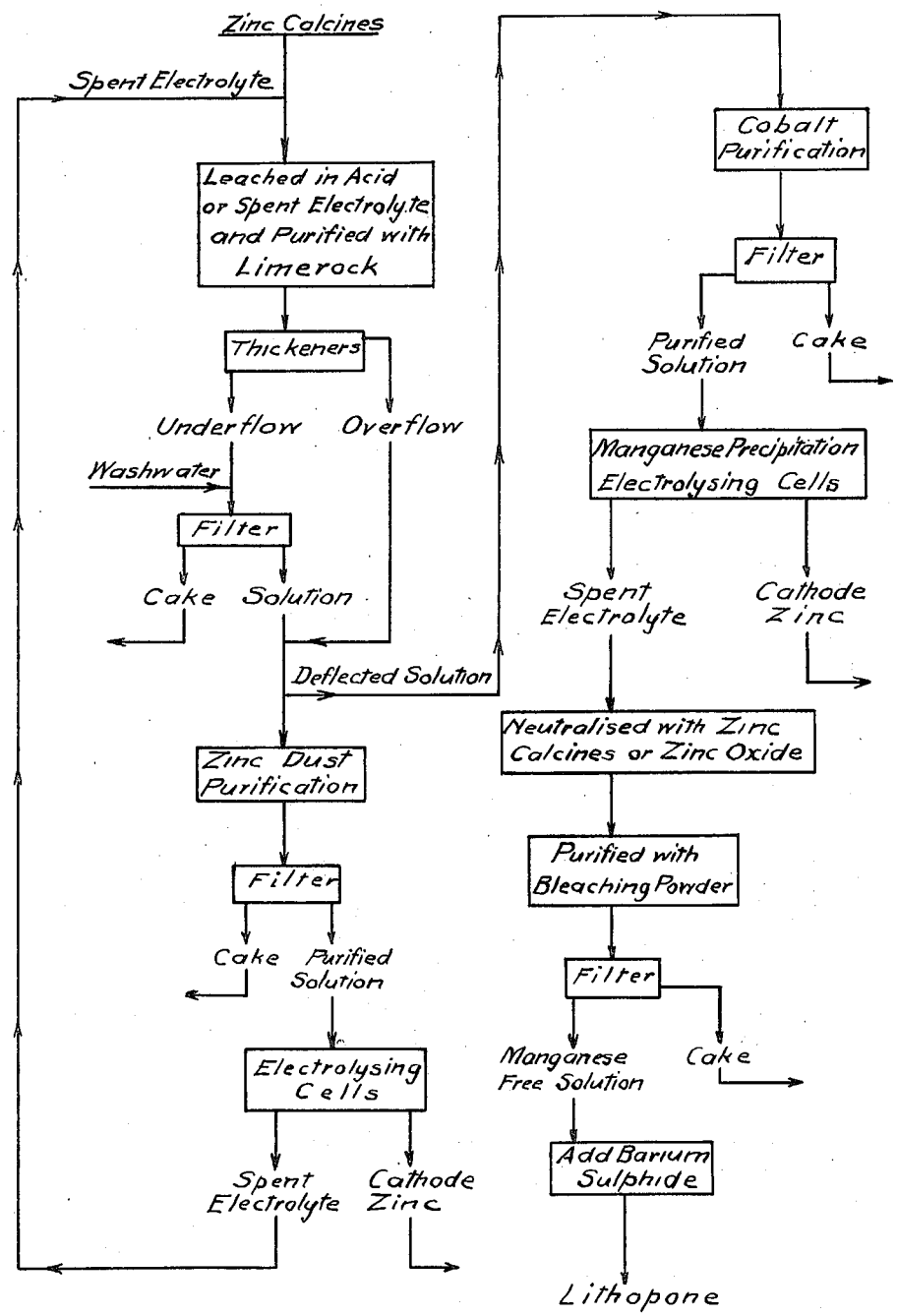

UNITED STATES PATENT OFFICE.

HERBERT WILLIAM GEPP, OF MELBOURNE, VICTORIA, AUSTRALIA, ASSIGNOR TO ELECTROLYTIC ZINC COMPANY OF AUSTRALASIA PROPRIETARY LIMITED, OF MELBOURNE, AUSTRALIA.

TREATMENT OF ZINC-BEARING ORES.

1,395,811.     Specification of Letters Patent.     Patented Nov. 1, 1921.

Application filed November 7, 1919. Serial No. 336,452.

*To all whom it may concern:*

Be it known that I, HERBERT WILLIAM GEPP, a subject of the King of Great Britain, residing at Collins House, 360–366 Collins street, Melbourne, in the State of Victoria, Commonwealth of Australia, but temporarily resident in New York, United States, general manager, have invented certain new and useful Improvements in the Treatment of Zinc-Bearing Ores, of which the following is a specification.

This invention relates to certain improvements in the treatment of zinc bearing ores and relates more especially to the treatment of zinc sulfid concentrates (blende) or other zinc bearing material.

This invention is applicable to that method of treatment in which the roasted ore or calcines are leached with sulfuric acid (spent electrolyte) and the zinc sulfate solutions formed thereby are subjected to electrolysis for the electro-deposition of zinc therefrom, the liquors being maintained in continuous circulation.

In the recovery of zinc by electro-deposition it has been found that the presence of certain impurities interferes with and detrimentally affects the deposition of the zinc and experience has shown that when such impurities have accumulated to a certain extent by the continuous circulation of the solutions it is essential that such impurities be removed for effective working.

Furthermore the cyclic process above indicated restricts considerably the extent to which washing of the residues can be effected when separating the solutions from the insoluble residues by filter presses or other like means. The addition of such washing waters is limited to the depletion of the solutions by moisture left in residues, leakage and evaporation. Consequently the washing of such residues is found to be more or less ineffective causing considerable losses of water soluble zinc therein.

The object of this invention is to provide a method of treatment whereby a certain amount of zinc bearing solution is removed from time to time from the cycle used in the electro-deposition of zinc thereby preventing the accumulation of impurities beyond certain limits and also enabling the washing of the residues to be more thoroughly effected and further utilizing the said solution removed for the formation of useful commercial products.

I accomplish this object by providing an improved method for the treatment of zinc bearing ores which comprises a combination process of electrolytic treatment and the manufacture of lithopone, a certain quantity of zinc bearing solution being removed from time to time from the electrolytic cycle in accordance with the amount required to prevent the accumulation of impurities beyond certain limits and to enable the more thorough washing of the residues, the said amount of solution removed being utilized for the manufacture of lithopone.

In carrying out this invention the ores are first roasted and then treated with a solution containing dilute sulfuric acid (spent electrolyte) in order to dissolve the greater part of the zinc. The resultant solution is then treated for the removal of impurities in the ordinary way such as with limerock and zinc dust and submitted to electrolysis for the electro-deposition of zinc. The spent electrolyte is then reused for the leaching of fresh calcined ore and the cycle maintained in the usual way. There are however certain impurities not removed by the usual methods of treatment and these impurities, not so removed, gradually accumulate by the continual circulation of the solutions. In practice it is found to be desirable not to permit the accumulation of these impurities beyond a certain limit and for this purpose a certain proportion of the solutions is withdrawn during each cycle.

The determination of the amount of such withdrawal of such solutions is dependent upon the rate of accumulation of impurities which deleteriously affect the electro-deposition of the zinc.

The quantity of solution that should be withdrawn from each cycle, must be such as will contain the amount of impurities which would be added during that period. By taking into consideration the quantity of solution used in a cycle over a given period and the analysis of the solutions before and after the said period, it is easy to determine the total quantity of impurities which have accumulated in the solution during that period. Similarly the quantity of solution may be calculated which will contain total impurities equal to this added accumulation. For the purposes of this invention this quantity of solution must be withdrawn from the cycle and an equivalent quantity of water added, (preferably in the form of wash water from residues) in order to bring the amount of impurities in the solution back to the amount present at the beginning of the period. In this way the impurities present in the solution may be maintained at about a predetermined limit which has been found by experience to be permissible or desirable in the solution in cycle.

At the same time the addition of wash water to the cycle to compensate for the quantity of solution withdrawn, allows the residues to be washed much more thoroughly, and prevents loss of zinc therein that would otherwise occur.

The deflected solution which is to be utilized for the manufacture of lithopone must usually undergo purification to remove impurities which would interfere with the production of and seriously affect the properties of the lithopone. These impurities generally consist for the most part of cobalt and manganese. If cobalt is present it should be removed before proceeding with the removal of the manganese. For this purpose the solutions may be subjected to treatment with zinc dust in the presence of a soluble arsenic compound for the precipitation of the cobalt.

The manganese is then removed preferably in two stages, the first stage consisting in electrolyzing the solution whereby the greater proportion of the manganese is precipitated as dioxid and the second stage consisting in the removal of the remaining manganese by suitable oxidizing agents. In proceeding to the treatment for the removal of manganese by the first stage as above indicated the solution (after the removal of cobalt) may be either treated direct or first concentrated by evaporation. When submitting the solution to electrolysis direct, the operation must be conducted at a relatively low temperature to secure which refrigeration will be necessary in localities where the mean atmospheric temperature is fairly high. If the deflected solution is first concentrated by evaporation then the electrolysis may be efficiently conducted at a temperature of about 30° C. The greater proportion of the manganese is precipitated in the cells and the effluent therefrom will contain only a small proportion of manganese and a zinc content lower than before electrolysis but will be correspondingly higher in acid. The free acid in the solution is neutralized with calcine, zinc oxid or the like and is then treated for the removal of the remaining manganese by suitable oxidizing agents such as bleaching powder or sodium hypochlorite. It will be obvious that in some cases particularly where the manganese content is low it will be an advantage to precipitate the whole of the manganese directly by a suitable oxidizing agent.

The accompanying drawing further illustrates the present invention by means of a flow sheet. This flow sheet will be readily understood by those skilled in the art from the foregoing description of the invention, and, accordingly, a detailed explanation of the flow sheet is unnecessary.

The purified zinc sulfate solution is then allowed to interact with barium sulfid for the manufacture of lithopone in the well known way.

I claim:—

1. An improved process for the treatment of zinc bearing ores consisting in the combination with electrolytic treatment for the recovery of metallic zinc in which the ores are leached with acid solutions (spent electrolyte) and the resultant zinc bearing solution subjected to electrolysis the spent electrolyte then being used cyclically to leach another batch of ore, of a method for the treatment of zinc bearing solutions removed from time to time from the electrolytic cycle and used for the manufacture of lithopone, the amount of solution withdrawn being sufficient to prevent the building up in the electrolytic cycle of impurities beyond workable limits and also permitting the washing of the leached residues without increasing the volume of the electrolyte.

2. An improved process for the treatment of zinc bearing ores consisting in the combination with electrolytic treatment for the recovery of metallic zinc in which the ores are leached with acid solutions (spent electrolyte) and the resultant zinc bearing solution subjected to electrolysis the spent electrolyte then being used cyclically to leach another batch of ore, of a method for the treatment of zinc bearing solutions removed from time to time from the electrolytic cycle in which such solution is purified to remove manganese and is then mixed with barium sulfid so as to form lithopone, the amount of solution withdrawn being sufficient to prevent the building up in the electrolytic cycle of impurities beyond workable limits and also permitting the washing of the leached residues without increasing the volume of the electrolyte.

3. An improved process for the treatment of zinc bearing ores consisting in the combination with electrolytic treatment for the recovery of metallic zinc in which the ores are leached with acid solutions (spent electrolyte) and the resultant zinc bearing solution subjected to electrolysis the spent electrolyte then being used cyclically to leach another batch of ore, of a method for the treatment of zinc bearing solution removed from time to time from the electrolytic cycle in which such solution is successively purified to remove cobalt and manganese and mixed with barium sulfid so as to form lithopone, the amount of solution withdrawn being sufficient to prevent the building up in the electrolytic cycle of impurities beyond workable limits and also permitting the washing of the leached residues without increasing the volume of the electrolyte.

4. An improved process for the treatment of zinc bearing ores consisting in the combination with electrolytic treatment for the recovery of metallic zinc in which the ores leached with acid solutions (spent electrolyte) and the resultant zinc bearing solution subjected to electrolysis the spent electrolyte then being used cyclically to leach another batch of ore, of a method for the treatment of zinc bearing solution removed from time to time from the electrolytic cycle in which such solution is successively purified by removing cobalt from such solution by precipitation with zinc in the presence of a soluble arsenic compound and then removing the bulk of the manganese by electrolytic precipitation and the remainder of the manganese by means of an oxidizing compound, the amount of solution withdrawn being sufficient to prevent the building up in the electrolytic cycle of impurities beyond workable limits and also permitting the washing of the leached residues without increasing the volume of the electrolyte.

5. An improved process for the treatment of zinc bearing ores which comprises leaching oxidized zinc-bearing material, purifying the resulting zinc bearing solution by means of limerock, electrolyzing the purified solution and using the acid effluent from the electrolysis for leaching a further quantity of oxidized zinc bearing material, withdrawing a portion of the electrolyte prior to electrolysis, and after further purification utilizing such withdrawn and purified solution in the manufacture of lithopone, the amount of solution withdrawn being such as will prevent the accumulation of impurities in the electrolytic cycle beyond workable limits and at the same time permit the efficient washing of the residues.

6. An improved process for the treatment of zinc bearing ores which comprises leaching oxidized zinc bearing material, purifying the resulting zinc bearing solution by means of limerock and zinc dust, electrolyzing the purified solution and using the acid effluent from the electrolysis for leaching a further quantity of oxidized zinc bearing material, withdrawing a portion of the electrolyte prior to electrolysis and removing cobalt if present by precipitation with zinc dust in the presence of a soluble arsenic compound and the manganese by electrolytic precipitation followed by precipitation by oxidizing agents, and finally converting such withdrawn and purified solution into lithopone, the amount of solution withdrawn being such as will prevent the accumulation of certain impurities in the electrolytic cycle beyond workable limits and at the same time permit the efficient washing of the residues.

In testimony whereof I have signed my name to this specification.

HERBERT WILLIAM GEPP.